US008054320B1

(12) United States Patent
Clark et al.

(10) Patent No.: US 8,054,320 B1
(45) Date of Patent: Nov. 8, 2011

(54) HORIZONTAL STRIP COLUMN-FIRST TWO-DIMENSIONAL SCALING

(75) Inventors: Gordon R. Clark, Meridian, ID (US); Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 12/947,690

(22) Filed: Nov. 16, 2010

Related U.S. Application Data

(63) Continuation of application No. 11/827,931, filed on Jul. 13, 2007, now Pat. No. 7,839,424.

(60) Provisional application No. 60/830,589, filed on Jul. 13, 2006.

(51) Int. Cl.
*G09G 5/00* (2006.01)
*G06K 9/32* (2006.01)

(52) U.S. Cl. ......................... 345/660; 345/667; 382/298

(58) Field of Classification Search .................. 345/660, 345/668, 472; 382/298
See application file for complete search history.

(56) References Cited

U.S. PATENT DOCUMENTS

| | | | | |
|---|---|---|---|---|
| 5,825,367 | A * | 10/1998 | Shyu et al. | 345/668 |
| 6,239,847 | B1 * | 5/2001 | Deierling | 348/581 |
| 7,286,720 | B2 * | 10/2007 | Ueda | 382/298 |
| 7,536,062 | B2 | 5/2009 | Lippincott | |
| 2002/0196260 | A1 | 12/2002 | Candler et al. | |
| 2004/0046773 | A1 | 3/2004 | Inoue et al. | |
| 2004/0160452 | A1 | 8/2004 | Song et al. | |
| 2006/0061827 | A1 | 3/2006 | Moss et al. | |
| 2007/0177056 | A1 | 8/2007 | Zhou et al. | |
| 2008/0069465 | A1 | 3/2008 | Higashi | |

* cited by examiner

*Primary Examiner* — Chante Harrison

(57) ABSTRACT

A system is provided for scaling image data comprising a Direct Memory Access (DMA) engine adapted to read the image data from a horizontal pixel strip in a column-by-column format, a scaling block adapted to scale the image data read by the read DMA engine into scaled column output data, and a buffer memory for storing the scaled column output data for the horizontal pixel strip. A method is also provided for scaling an image comprising reading pixel values from a pixel strip in a column-by-column manner across the pixel strip and scaling the pixel values for each column to produce scaled column output data. The scaled column output data for a plurality of columns is then read and the scaled column output data is scaled from the plurality of columns to produce scaled row output data for a row of pixels.

20 Claims, 8 Drawing Sheets

62

60

| | | | | | | | | | |
|---|---|---|---|---|---|---|---|---|---|
| (0,0) | (0,1) | (0,2) | (0,3) | (0,4) | (0,5) | (0,6) | • • • | (0,n-1) | (0,n) |
| (1,0) | (1,1) | (1,2) | (1,3) | (1,4) | (1,5) | (1,6) | • • • | (1,n-1) | (1,n) |
| (2,0) | (2,1) | (2,2) | (2,3) | (2,4) | (2,5) | (2,6) | • • • | (2,n-1) | (2,n) |
| (3,0) | (3,1) | (3,2) | (3,3) | (3,4) | (3,5) | (3,6) | • • • | (3,n-1) | (3,n) |
| (4,0) | (4,1) | (4,2) | (4,3) | (4,4) | (4,5) | (4,6) | • • • | (4,n-1) | (4,n) |
| (5,0) | (5,1) | (5,2) | (5,3) | (5,4) | (5,5) | (5,6) | • • • | (5,n-1) | (5,n) |
| (6,0) | (6,1) | (6,2) | (6,3) | (6,4) | (6,5) | (6,6) | • • • | (6,n-1) | (6,n) |
| (7,0) | (7,1) | (7,2) | (7,3) | (7,4) | (7,5) | (7,6) | • • • | (7,n-1) | (7,n) |
| (8,0) | (8,1) | (8,2) | (8,3) | (8,4) | (8,5) | (8,6) | • • • | (8,n-1) | (8,n) |
| (9,0) | (9,1) | (9,2) | (9,3) | (9,4) | (9,5) | (9,6) | • • • | (9,n-1) | (9,n) |
| (10,0) | (10,1) | (10,2) | (10,3) | (10,4) | (10,5) | (10,6) | • • • | (10,n-1) | (10,n) |
| (11,0) | (11,1) | (11,2) | (11,3) | (11,4) | (11,5) | (11,6) | • • • | (11,n-1) | (11,n) |
| (12,0) | (12,1) | (12,2) | (12,3) | (12,4) | (12,5) | (12,6) | • • • | (12,n-1) | (12,n) |
| (13,0) | (13,1) | (13,2) | (13,3) | (13,4) | (13,5) | (13,6) | • • • | (13,n-1) | (13,n) |
| (14,0) | (14,1) | (14,2) | (14,3) | (14,4) | (14,5) | (14,6) | • • • | (14,n-1) | (14,n) |
| (15,0) | (15,1) | (15,2) | (15,3) | (15,4) | (15,5) | (15,6) | • • • | (15,n-1) | (15,n) |
| (16,0) | (16,1) | (16,2) | (16,3) | (16,4) | (16,5) | (16,6) | • • • | (16,n-1) | (16,n) |
| (17,0) | (17,1) | (17,2) | (17,3) | (17,4) | (17,5) | (17,6) | • • • | (17,n-1) | (17,n) |
| (18,0) | (18,1) | (18,2) | (18,3) | (18,4) | (18,5) | (18,6) | • • • | (18,n-1) | (18,n) |
| (19,0) | (0,1) | (0,2) | (0,3) | (0,4) | (0,5) | (0,6) | • • • | (0,n-1) | (0,n) |
| (20,0) | (20,1) | (20,2) | (20,3) | (20,4) | (20,5) | (20,6) | • • • | (20,n-1) | (20,n) |
| (21,0) | (21,1) | (21,2) | (21,3) | (21,4) | (21,5) | (21,6) | • • • | (21,n-1) | (21,n) |
| (22,0) | (22,1) | (22,2) | (22,3) | (22,4) | (22,5) | (22,6) | • • • | (22,n-1) | (22,n) |
| (23,0) | (23,1) | (23,2) | (23,3) | (23,4) | (23,5) | (23,6) | • • • | (23,n-1) | (23,n) |
| (24,0) | (24,1) | (24,2) | (24,3) | (24,4) | (24,5) | (24,6) | • • • | (24,n-1) | (24,n) |
| (25,0) | (25,1) | (25,2) | (25,3) | (25,4) | (25,5) | (25,6) | • • • | (25,n-1) | (25,n) |
| (26,0) | (26,1) | (26,2) | (26,3) | (26,4) | (26,5) | (26,6) | • • • | (26,n-1) | (26,n) |
| (27,0) | (27,1) | (27,2) | (27,3) | (27,4) | (27,5) | (27,6) | • • • | (27,n-1) | (27,n) |
| (28,0) | (28,1) | (28,2) | (28,3) | (28,4) | (28,5) | (28,6) | • • • | (28,n-1) | (28,n) |
| (29,0) | (29,1) | (29,2) | (29,3) | (29,4) | (29,5) | (29,6) | • • • | (29,n-1) | (29,n) |
| (30,0) | (30,1) | (30,2) | (30,3) | (30,4) | (30,5) | (30,6) | • • • | (30,n-1) | (30,n) |
| (31,0) | (31,1) | (31,2) | (31,3) | (31,4) | (31,5) | (31,6) | • • • | (31,n-1) | (31,n) |
| (32,0) | (32,1) | (32,2) | (32,3) | (32,4) | (32,5) | (32,6) | • • • | (32,n-1) | (32,n) |
| (33,0) | (33,1) | (33,2) | (33,3) | (33,4) | (33,5) | (33,6) | • • • | (33,n-1) | (33,n) |
| (34,0) | (34,1) | (34,2) | (34,3) | (34,4) | (34,5) | (34,6) | • • • | (34,n-1) | (34,n) |
| (35,0) | (35,1) | (35,2) | (35,3) | (35,4) | (35,5) | (35,6) | • • • | (35,n-1) | (35,n) |
| (36,0) | (36,1) | (36,2) | (36,3) | (36,4) | (36,5) | (36,6) | • • • | (36,n-1) | (36,n) |
| • • • | • • • | • • • | • • • | • • • | • • • | • • • | • • • | • • • | • • • |
| • • • | • • • | • • • | • • • | • • • | • • • | • • • | • • • | • • • | • • • |
| (r-1,0) | (r-1,1) | (r-1,2) | (r-1,3) | (r-1,4) | (r-1,5) | (r-1,6) | • • • | (r-1,n-1) | (r-1,0) |
| (r,0) | (r,1) | (r,2) | (r,3) | (r,4) | (r,5) | (r,6) | • • • | (r,n-1) | (r,n) |

*FIG. 3*

60

64

| | | | | | | | | | |
|---|---|---|---|---|---|---|---|---|---|
| (0,0) | (0,1) | (0,2) | (0,3) | (0,4) | (0,5) | (0,6) | • • • | (0,n-1) | (0,n) |
| (1,0) | (1,1) | (1,2) | (1,3) | (1,4) | (1,5) | (1,6) | • • • | (1,n-1) | (1,n) |
| (2,0) | (2,1) | (2,2) | (2,3) | (2,4) | (2,5) | (2,6) | • • • | (2,n-1) | (2,n) |
| (3,0) | (3,1) | (3,2) | (3,3) | (3,4) | (3,5) | (3,6) | • • • | (3,n-1) | (3,n) |
| (4,0) | (4,1) | (4,2) | (4,3) | (4,4) | (4,5) | (4,6) | • • • | (4,n-1) | (4,n) |
| (5,0) | (5,1) | (5,2) | (5,3) | (5,4) | (5,5) | (5,6) | • • • | (5,n-1) | (5,n) |
| (6,0) | (6,1) | (6,2) | (6,3) | (6,4) | (6,5) | (6,6) | • • • | (6,n-1) | (6,n) |
| (7,0) | (7,1) | (7,2) | (7,3) | (7,4) | (7,5) | (7,6) | • • • | (7,n-1) | (7,n) |
| (8,0) | (8,1) | (8,2) | (8,3) | (8,4) | (8,5) | (8,6) | • • • | (8,n-1) | (8,n) |
| (9,0) | (9,1) | (9,2) | (9,3) | (9,4) | (9,5) | (9,6) | • • • | (9,n-1) | (9,n) |
| (10,0) | (10,1) | (10,2) | (10,3) | (10,4) | (10,5) | (10,6) | • • • | (10,n-1) | (10,n) |
| (11,0) | (11,1) | (11,2) | (11,3) | (11,4) | (11,5) | (11,6) | • • • | (11,n-1) | (11,n) |
| (12,0) | (12,1) | (12,2) | (12,3) | (12,4) | (12,5) | (12,6) | • • • | (12,n-1) | (12,n) |
| (13,0) | (13,1) | (13,2) | (13,3) | (13,4) | (13,5) | (13,6) | • • • | (13,n-1) | (13,n) |
| (14,0) | (14,1) | (14,2) | (14,3) | (14,4) | (14,5) | (14,6) | • • • | (14,n-1) | (14,n) |
| (15,0) | (15,1) | (15,2) | (15,3) | (15,4) | (15,5) | (15,6) | • • • | (15,n-1) | (15,n) |
| (16,0) | (16,1) | (16,2) | (16,3) | (16,4) | (16,5) | (16,6) | • • • | (16,n-1) | (16,n) |
| (17,0) | (17,1) | (17,2) | (17,3) | (17,4) | (17,5) | (17,6) | • • • | (17,n-1) | (17,n) |
| (18,0) | (18,1) | (18,2) | (18,3) | (18,4) | (18,5) | (18,6) | • • • | (18,n-1) | (18,n) |
| (19,0) | (0,1) | (0,2) | (0,3) | (0,4) | (0,5) | (0,6) | • • • | (0,n-1) | (0,n) |
| (20,0) | (20,1) | (20,2) | (20,3) | (20,4) | (20,5) | (20,6) | • • • | (20,n-1) | (20,n) |
| (21,0) | (21,1) | (21,2) | (21,3) | (21,4) | (21,5) | (21,6) | • • • | (21,n-1) | (21,n) |
| (22,0) | (22,1) | (22,2) | (22,3) | (22,4) | (22,5) | (22,6) | • • • | (22,n-1) | (22,n) |
| (23,0) | (23,1) | (23,2) | (23,3) | (23,4) | (23,5) | (23,6) | • • • | (23,n-1) | (23,n) |
| (24,0) | (24,1) | (24,2) | (24,3) | (24,4) | (24,5) | (24,6) | • • • | (24,n-1) | (24,n) |
| (25,0) | (25,1) | (25,2) | (25,3) | (25,4) | (25,5) | (25,6) | • • • | (25,n-1) | (25,n) |
| (26,0) | (26,1) | (26,2) | (26,3) | (26,4) | (26,5) | (26,6) | • • • | (26,n-1) | (26,n) |
| (27,0) | (27,1) | (27,2) | (27,3) | (27,4) | (27,5) | (27,6) | • • • | (27,n-1) | (27,n) |
| (28,0) | (28,1) | (28,2) | (28,3) | (28,4) | (28,5) | (28,6) | • • • | (28,n-1) | (28,n) |
| (29,0) | (29,1) | (29,2) | (29,3) | (29,4) | (29,5) | (29,6) | • • • | (29,n-1) | (29,n) |
| (30,0) | (30,1) | (30,2) | (30,3) | (30,4) | (30,5) | (30,6) | • • • | (30,n-1) | (30,n) |
| (31,0) | (31,1) | (31,2) | (31,3) | (31,4) | (31,5) | (31,6) | • • • | (31,n-1) | (31,n) |
| (32,0) | (32,1) | (32,2) | (32,3) | (32,4) | (32,5) | (32,6) | • • • | (32,n-1) | (32,n) |
| (33,0) | (33,1) | (33,2) | (33,3) | (33,4) | (33,5) | (33,6) | • • • | (33,n-1) | (33,n) |
| (34,0) | (34,1) | (34,2) | (34,3) | (34,4) | (34,5) | (34,6) | • • • | (34,n-1) | (34,n) |
| (35,0) | (35,1) | (35,2) | (35,3) | (35,4) | (35,5) | (35,6) | • • • | (35,n-1) | (35,n) |
| (36,0) | (36,1) | (36,2) | (36,3) | (36,4) | (36,5) | (36,6) | • • • | (36,n-1) | (36,n) |
| • • • | • • • | • • • | • • • | • • • | • • • | • • • | • • • | • • • | • • • |
| • • • | • • • | • • • | • • • | • • • | • • • | • • • | • • • | • • • | • • • |
| (r-1,0) | (r-1,1) | (r-1,2) | (r-1,3) | (r-1,4) | (r-1,5) | (r-1,6) | • • • | (r-1,n-1) | (r-1,0) |
| (r,0) | (r,1) | (r,2) | (r,3) | (r,4) | (r,5) | (r,6) | • • • | (r,n-1) | (r,n) |

*FIG. 4*

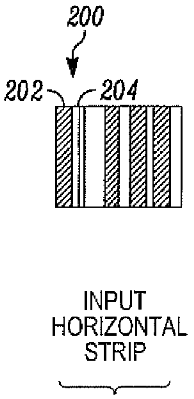
FIG. 6A
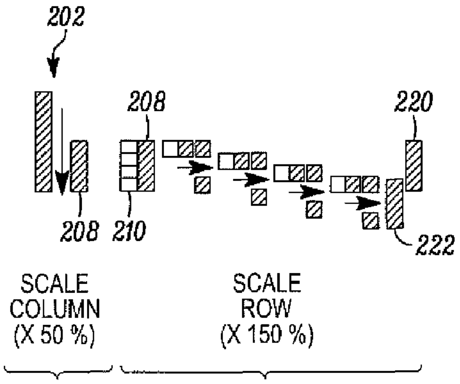
FIG. 6B FIG. 6C
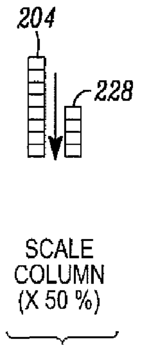
FIG. 6D
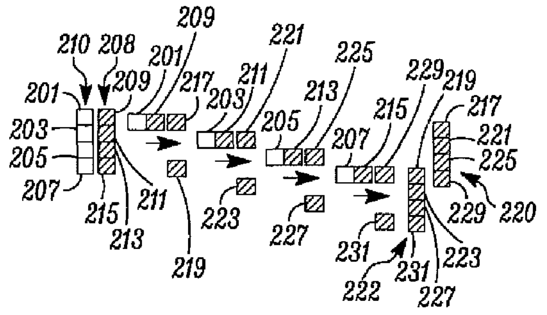
FIG. 6C (ENLARGED)
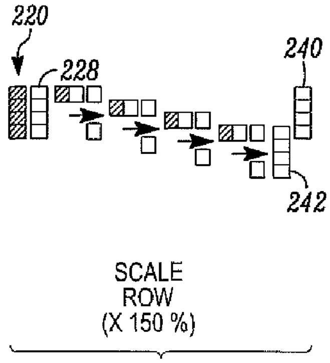
FIG. 6E
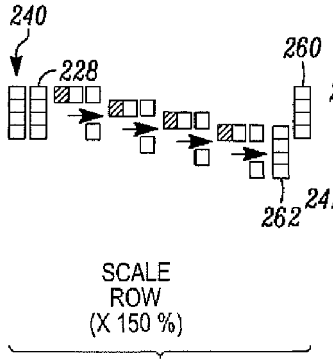
FIG. 6F
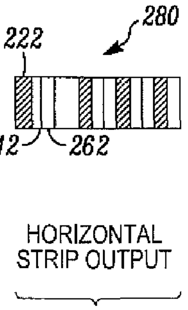
FIG. 6G

HORIZONTAL STRIP COLUMN-FIRST TWO-DIMENSIONAL SCALING

PRIORITY CLAIM

This application is a continuation of U.S. application Ser. No. 11/827,931, filed Jul. 13, 2007 which claims priority to U.S. Provisional Patent Application No. 60/830,589, filed on Jul. 13, 2006, the entirety of which is incorporated herein.

BACKGROUND

The present invention relates in particular to digital image processing systems and methods for efficiently scaling digital images.

Processing of digital images typically follows a rasterized path. Pixel values are read and processed from left to right within a single line, and lines are processed from top to bottom. Image processing operations such as scaling operate on areas that span multiple lines and columns of a digital image. Typically, to scale a group of image pixels, line buffering is necessary to temporarily store pixel values for multiple lines. Even though an area-based algorithm may only use a small number of pixels within a given line, the entire line must be buffered before scaling operations on the columns may be performed. Storage allocation for the multiple lines of scaled output data may be static or dynamic. The allocation size is dependent on the scale factor, the pixel resolution per area, the image size and the column length. Because memory resources are limited, efficient static memory allocation is preferred.

When a scaling operation is implemented in hardware, the resolution and image width will define the amount of memory, typically SRAM, needed for buffering. If the resolution doubles, the amount of memory doubles. Typically the amount of SRAM available for buffering is fixed within an Application Specific Integrated Circuit (ASIC) implementing the desired function. Thus, a decision regarding the size of the buffer must be made early on in a design project in which line buffering will be required. If a later product needs more buffering, or if specifications change, the ASIC must be redesigned. This can add significant cost and delay to the project.

BRIEF SUMMARY

The present invention is defined by the claims, and nothing in this section should be taken as a limitation on those claims. By way of introduction, the preferred embodiments described below provide systems and methods for scaling digital image data while conserving memory resources. By reducing the use of memory when processing in this manner, system bus bandwidth is also conserved. Furthermore, the embodiments provide scaling functions that are independent of image size and resolution, and that allow for the efficient implementation of the scaling operation into an image processing pipeline.

In one preferred embodiment, a system is provided for scaling image data comprising a Direct Memory Access (DMA) engine adapted to read the image data from a horizontal pixel strip in a column-by-column manner, a scaling block adapted to scale the image data read by the read DMA engine into scaled column output data, and a buffer memory for storing the scaled column output data for the horizontal pixel strip.

In another embodiment, a system for scaling image data is provided including memory access means for reading the image data from a horizontal pixel strip in a column-by-column format, a scaling means for scaling the image data read by the memory access means into scaled column output data, and a memory means for storing the scaled column output data for the horizontal pixel strip.

In yet another embodiment, a method of scaling an image having a plurality of pixel strips is provided, each strip having a plurality of pixels arranged in rows and columns. The method comprises reading pixel values from a pixel strip in a column-by-column manner, and scaling the pixel values for each column to produce scaled column output data. The scaled column output data is scaled to produce scaled row output data for a row of pixels.

Other preferred embodiments are provided, and each of the preferred embodiments described herein can be used alone or in combination with one another. The preferred embodiments will now be described with reference to the attached drawings.

BRIEF DESCRIPTION OF THE DRAWINGS

FIG. 3 is a typical digital image pixel array with a first horizontal pixel strip;

FIG. 4 is a typical digital image pixel array with a second horizontal pixel strip;

FIGS. 6A-6G are schematic diagrams illustrating scaling operations on groups of pixels;

DETAILED DESCRIPTION OF THE PRESENTLY PREFERRED EMBODIMENTS

Figure 1:
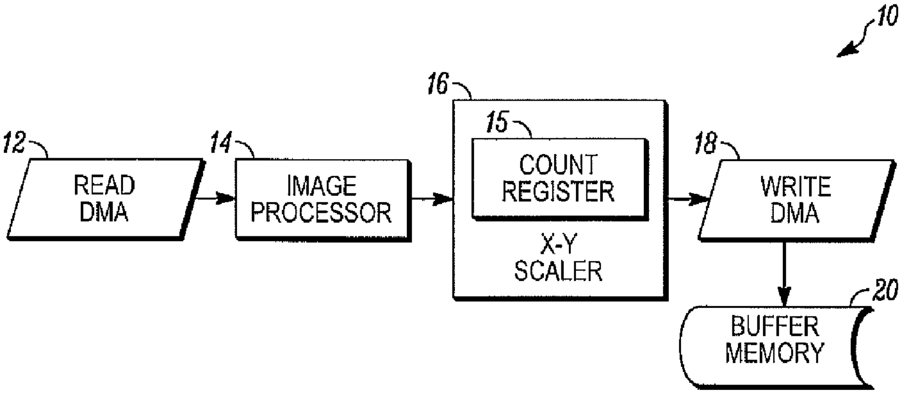
FIG. 1 is a block diagram of a digital image scaling system in accordance with a first embodiment.

FIG. 1 is a block diagram of a digital image processing system 10. The digital image processing system 10 may be a stand-alone system, or may be a component of a larger, more complex image processing system. For example, the image processing system 10 may be a scaling system for scaling digital images within a scanner, printer, copier, or some other image processing device. The digital image processing system 10 includes a Direct Memory Access (DMA) engine 12, an image processor 14, a scaling block 16, a write DMA engine 18 and a buffer memory 20.

It should be noted that the read DMA engine 12 may receive image data from a mass storage device such as an optical and/or magnetic storage device, for example a hard disk drive HDD and/or DVDs, or any other data storage device that stores data in a nonvolatile manner, such as non-volatile ROM. Image data may also be read from volatile memory such as RAM, DRAM and SRAM. Furthermore, the read DMA engine 12 may receive image data from a scanner sensor or CCD. The read DMA engine 12 functions to re-order image data to traverse a pixel strip or pixel array from the image in a columnar fashion, column-by-column.

The image processor 14 manipulates the pixel values of digital images processed by the image processing system 10. The image processor 14 may be any type of logic device capable of performing a desired image processing function on digital image data. For example, the image processor 14 may be a microprocessor programmed to perform a desired function (e.g. color space conversion, scaling or profile conversion), such as a specially designed ASIC, a programmable logic array, or any other suitable processing device. The image processor 14 manipulates the pixel values according to the particular function to be carried out by the image processing system 10.

The scaling block 16 may be a multiplier or other processor that may be used to perform scaling functions or apply scaling algorithms on the incoming columnar pixel values in the column (or Y) direction by modifying the pixel values by a scale factor. As with the image processor 14, the scaling block 16 may be a microprocessor, ASIC, multiplier or other suitable process device. The scaling block 16 operates also to scale the scaled output columns in the row (or X) direction. Finally, the write DMA engine 18 outputs the two-dimensional scaled image data to the buffer memory 20. The buffer memory 20 may be a random access memory (RAM), dynamic random access memory (DRAM), static random access memory (SRAM), a low latency nonvolatile memory such as flash memory and/or any other suitable electronic data storage medium.

Figure 2:
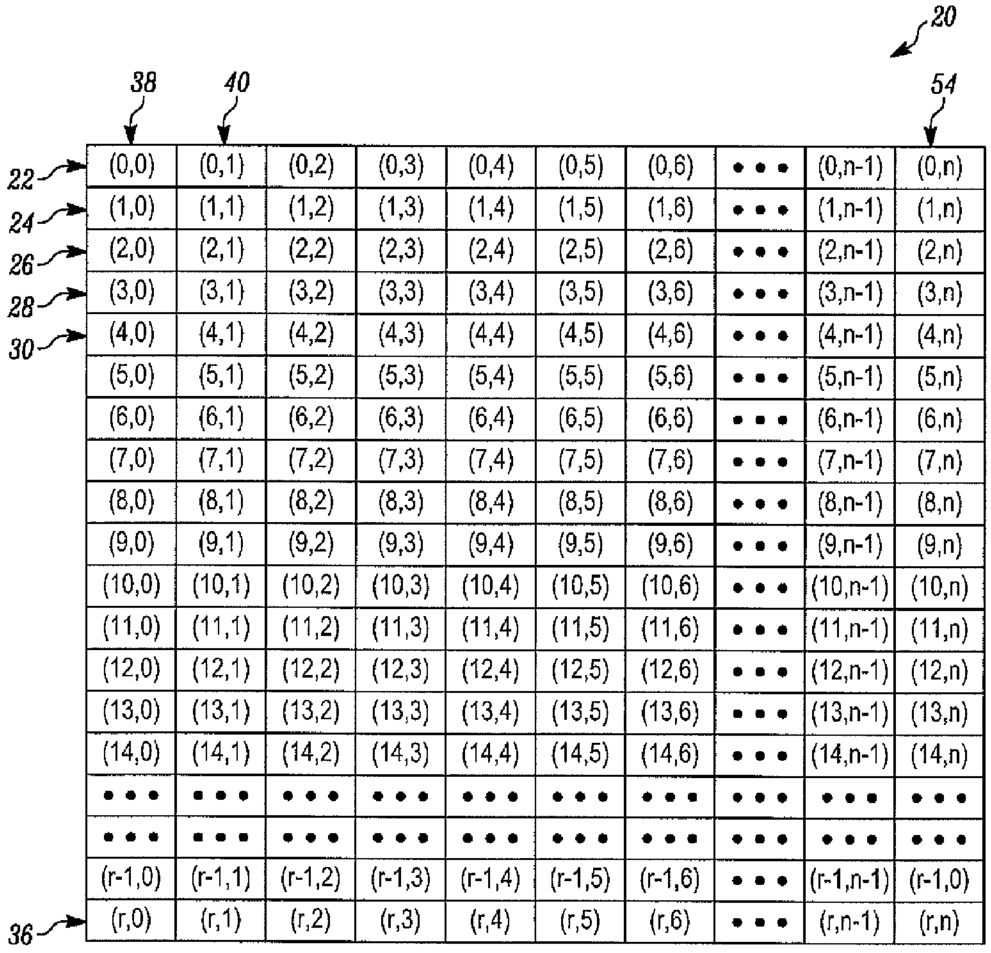
FIG. 2 is a typical digital image pixel array.

FIG. 2 shows a typical pixel array 20 for a digital image. The pixel array 20 comprises an r×n array of pixels, where r is the number of horizontal rows of pixels within the digital image, and n is the number of pixels within each row. One or more numeric values may be associated with each pixel, identifying the color, and/or the intensity of the pixel. When the appropriate colors are printed or displayed at the proper locations and at the proper intensity, the pixels collectively form a digital image.

When processing digital images, pixel values are typically read and processed line by line in a rasterized pattern from left to right and from top to bottom. Processing the pixel values in the pixel array 20 in this manner, the pixel values from a first row of pixels 22 is read from left to right starting with the pixel (0, 0) in the first, leftmost column 38, followed by the pixel (0, 1) in the second column 40, and so on until the last pixel in the first row 22, pixel (0, n) in the rightmost column 54, has been read. Thereafter the pixel values from the second row 24 are read from left to right starting with the pixel (1, 0) in the first column 38 and ending with the pixel (1, n) in the last column 54, and so on until the last pixel (r, n) in the last column 54 of the last row 36 has been read.

A complicating factor with prior art scaling functions is that, typically, all of the pixel values of the pixels within the array 20 must be read into a buffer memory before the sealing of the image may be performed. Using a traditional raster pattern for reading and processing pixel values therefore requires a substantial buffer memory. The specific size of the buffer memory will be dictated by the color resolution (i.e., the number of bits per pixel), the spatial resolution (i.e., the dpi or the number of pixels per line), and the number of lines of pixel values necessary to perform the scaling operation. Changing any of these parameters may have a significant impact on the size of buffer memory required for the scaling operation. For example, scaling to increase the width of an image may greatly increase the necessary capacity of the buffer memory.

An alternative is to read and process image data in a more efficient non-raster pattern. According to an embodiment of the invention, a digital image pixel array is broken down into a plurality of overlapping horizontal pixel strips. Pixel values are read and processed according to a non-raster pattern separately within each horizontal pixel strip. FIG. 3 shows an r×n digital image pixel array 60. A first horizontal pixel strip 62 comprises the first sixteen rows of pixel values within the image pixel array 60 (rows 0-15). FIG. 4 shows the same digital image pixel array 60, but with a second sixteen row horizontal pixel strip 64. The second horizontal pixel strip 64 partially overlaps the first horizontal pixel strip 62 such that rows 12-15 of the digital image pixel array 60 are included in both strips. In total, the second horizontal pixel strip includes rows 12-27 of the digital image pixel array 60.

In the preferred embodiment, the pixel values corresponding to the pixels in each horizontal pixel strip are read by the read DMA engine 12 and scaled by the scaling block 16 independently of one another. (Other image processing steps may be performed independently as well by the image processor 14). In other words, the pixel values relating to the pixels in the first horizontal pixel strip 62 are read by the read DMA engine 12 and scaled by the scaling block 16. When processing of the pixels within the first horizontal pixel strip is complete, processing of the pixels in the second horizontal pixel strip begins, and continues until the entire digital image pixel array 60 has been processed.

Figure 5:
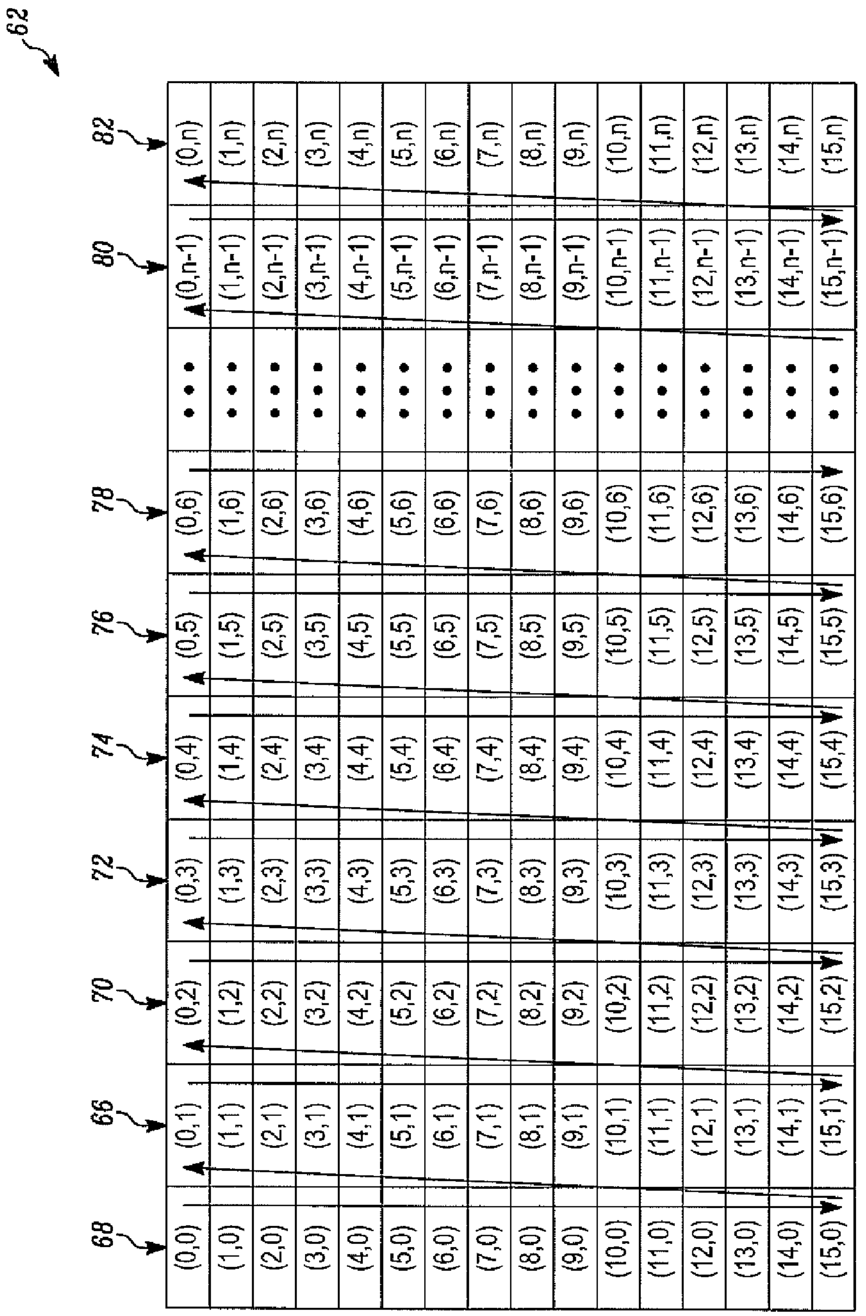
FIG. 5 is a first horizontal pixel strip illustrating a column-by-column pattern for processing pixel values.

Within each horizontal strip the pixel values are read and scaled according to a non-raster pattern shown in FIG. 5. Rather than reading the pixel values horizontally line-by-line, the pixel values are read in columnar fashion from top to bottom and from left to right. Thus, the pixel values for the pixels in the first column 68 are read first starting with pixel (0, 0), followed by pixel (1, 0) and so forth, ending with pixel (15, 0). Once the pixels in the first column 68 have been read, the pixels in the second column 66 are read, again in order from top to bottom. These are followed by the pixel values for the pixels in the third column 70, the fourth column 72, and so on until the pixel values for all of the pixels within the horizontal pixel strip have been read and scaled. The scaling of the pixel values within the horizontal pixel strip 62 will be described below. Reading and processing the pixel values in this manner allows the scaling of the pixel values to be carried out with far less data required to be stored.

In general, image scaling compresses or expands an image along x-y coordinate directions. The geometric transformation of the image can occur using many known algorithms. Scaling typically relies on the ability to examine multiple pixel values before computing the value of any given scaled output pixel. In other words, pixel values from nearby pixels affect the output values. The complexity of this operation is compounded for two-dimensional scaling, which relies on neighboring pixels in both the row and column directions.

Typically, if a horizontal strip area of an image is scaled row-first, the input data arrives row-by-row to the scaling block, and each input row results in a scaled output row that is saved in buffer memory. For scaling in the other (column) direction, one or more output rows that are in memory storage must be read so that a given column of input pixels can be scaled to arrive at an output pixel in the column direction. When the act of scaling produces one output pixel, the value is stored into a new two-dimensionally scaled row. Depending upon memory referencing ability or quantity of local memory, multiple-row scaled input pixels may be available and multiple two-dimensionally scaled output pixel locations may be available, so that scaling may proceed down the column or stop and move on to the next column. When scaling row-first, entire rows of data must either be stored in local memory, or referenced in external or buffer memory. This places limits on the capabilities of the scaling block implemented in the hardware.

In contrast, the preferred embodiment herein traverses a horizontal strip column-first. By traversing in this fashion, pixel data arrives column-by-column to the scaling block, and each input column results in a scaled output column (comprising scaled output column pixel values) that is saved in temporary memory. For scaling in the row direction, an output column is read pixel-by-pixel back from the memory so that a given row of input pixels can be scaled to formulate an output pixel in the row or horizontal direction. When scaling produces one output pixel, the value is stored into a new two-dimensionally scaled column. Since the horizontal strip has a finite height, only a limited amount of local storage is required to store the column scaled output pixel values and the finished two-dimensional scaled data is output from a memory buffer column-by-column. Using this approach, only a finite amount of columnar data is stored locally, and no other memory referencing during the scaling operation is required.

It should be noted that when scaling in this columnar fashion, the amount of output pixels may not always align with the burst size expected by the write DMA engine 18. The scaling block 16 forces data loss or data generation to create the correct sized scaled output.

To assist in the alignment of the pixel data for DMA transfers, the scaling block 16 includes an output pixel counter programmed into a register designated as the output strip column count register 15 as shown in FIG. 1. If the row direction scaled output is greater than the pixel count, then the output is truncated as appropriate. If the row direction scaled output is less than the count, then it will pad the output with either a preprogrammed pixel value or the values from the last column in the pixel strip. This function is implemented using the replicate mode bit in the output strip column count register and the color fill data registers (not shown).

FIGS. 6A-G are schematic representations of one example of horizontal-first scaling. This example may be varied depending on the particular scale algorithm, which in this case is a running average scale amount. Other examples include bi-linear scaling that may be implemented in similar fashion.

These particular pixel scaling steps are performed on columns of pixels read from an input horizontal strip 200. As shown in FIG. 6A, the horizontal strip 200 is divided into a plurality of single-pixel wide columns 202, 204, etc. Scaling of the horizontal strip by 50% in the column direction and 150% in the row direction is illustrated.

Scaling of each column in the column direction is performed on a column-by-column manner as shown in FIG. 6B. As shown, a scaling factor of 50% is applied to the exemplary column 202 to scale the eight dark pixels down by half in the column direction, resulting in a four-pixel tall row-scaled column 208.

FIG. 6C shows the 150% scaling of the row-scaled column 208 in the row direction. The output data from row-scaled column 208 is scaled with an initially empty accumulator 210 to produce an output of column pixels 222 scaled in the row direction. An enlarged drawing of FIG. 6C is shown further below. As shown in the enlarged view pixel-by-pixel, the fractional data for pixel 201 is taken from the accumulator 210 and scaled with the row-scaled column output data from pixel 209 from the column 208. This results in a scaled output pixel 219, with the fractional data for pixel 217 being saved in the column 220 for future use as the accumulator 210 in the next scaling pass. In similar fashion, the fractional data for pixel 203 is taken from the accumulator 210 and scaled with the row-scaled column output data from pixel 211. Scaled output pixel 223 is produced and the fractional data 221 is saved for the accumulator. Fractional data for pixels 205 and 207 are scaled with the row-scaled column output data from pixels 213 and 215, respectively, resulting in scaled output pixels 227 and 231, respectively. Fractional data 225 and 229 are then saved for the accumulator. The output column 222 is the final column output including output pixels 219, 223, 227 and 231 respectively. The output column 222 makes up the first column of the horizontal strip output 280 shown in FIG. 6G discussed further below.

The column 220 includes fractional values at 217, 221, 225 and 229 that are carried forward and put into the accumulator 210 as shown in the drawings below in FIGS. 6C, 6E and 6F. Between strips, these fractional amounts are overwritten continually and not carried forward for each column because such would require more buffer storage than an alternative "overlap" method. Overlap holds only a fractional amount for the last column that is already scaled for the pixels of a new incoming pixel strip. This in turn determines the pixels in the incoming strip that have not already been scaled. As shown above with respect to FIG. 6E, the accumulator 210 begins with the row fractional values 220 from FIG. 6C, and upon the completion of the scaling in FIG. 6E the accumulator 210 holds values 240. Similarly at FIG. 6F, the accumulator 210 starts with row fractional values 240 carried over from FIG. 6E and ends up holding row fractional values 260. A more detailed overlap example is discussed below with respect to FIGS. 7A-7C.

FIG. 6D shows a successive column 204 of eight pixels that is vertically scaled by 50% to produce a scaled output of four pixels 228. In FIG. 6E, similar to the steps described relative to FIG. 6C, the vertically scaled output 228 is then scaled with the fractional values in the accumulator 210 to produce an output of column pixels 242 scaled in the row direction, and the fractional values 240 are stored in the accumulator 210 upon completion.

Figure 7A:
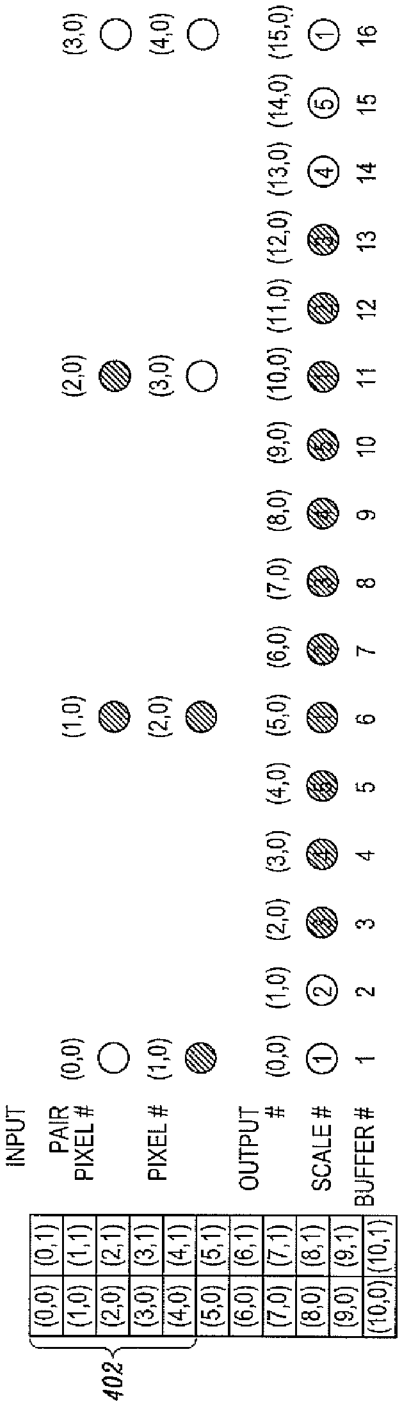
FIGS. 7A-7C are schematic diagrams illustrating further scaling operations including pixel-row overlapping.
Figure 7B:
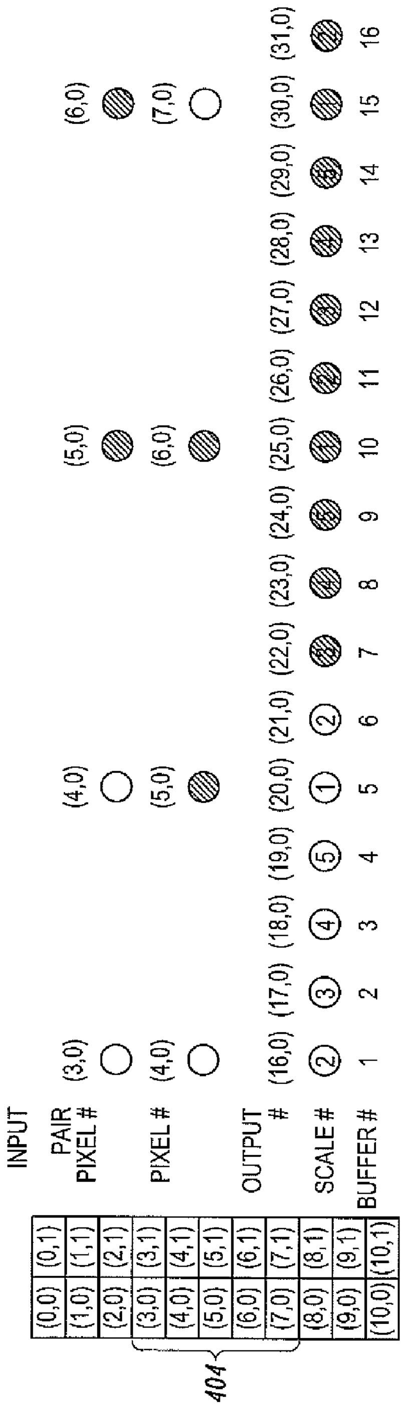
Figure 7C:
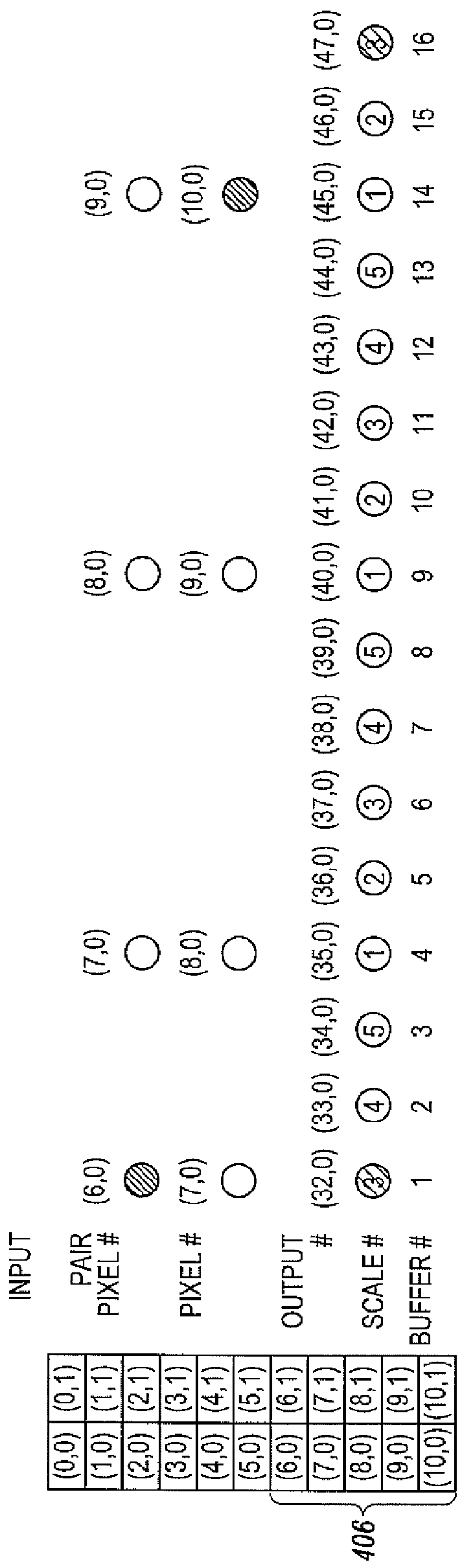

FIG. 6F shows a third scale row iteration, with the accumulator 210 filled with fractional values 240 from FIG. 6E. The same column 228 is then scaled an additional time with the fractional values in the accumulator 210 to produce an additional scaled column 262 in white in the row direction. Fractional values 260 from the scaling operation are stored in the accumulator 210. Finally, as shown in FIG. 6G, the resulting row-scaled columns 222, 242, 262 and other successive columns are assembled to create a horizontal strip output 280. In this example, a scale of 1.5× will produce three output columns out of two input columns FIGS. 7A-7C illustrate an example of linear enlarging and overlap. In this example, overlapping input strip portions read from the first column of FIG. 4 are processed and scaled by exactly 5×. Each of FIGS. 7A-7C only illustrates scaling on the first column of each strip portion, and each input pixel pair produces five scaled outputs indicated as "Scale #" 1 to 5 in the Figure. Also, column scaled output is indicated as "#(n, 0)", and a 16-bit buffer is indicated by "Buffer #" 1 to 16. The image pixel output will be the result of the columns of output scaled in the opposite direction to create output pixels. Because the output is set to 16 lines, and 16 is not an exact multiple of 5 (the scaling number), the overlap method must be used to arrive at the correct number of output lines in the final scaled result.

In FIG. 7A, the first four input lines of 402 that are scaled into output buffer Nos. 1-15 as shown to nearly fill the 16-pixel buffer. To fill the last position in this pixel buffer, a fifth input line is read. When the next set of lines 404, which overlaps with 402, is processed in FIG. 7B, the next scale number for this next set starts at 2 because the read-in values ended with scale number 1 in the previous 16-pixel buffer. In 7*b*, the overlapping lines (the same two lines as the last two read in FIG. 7A) are then re-read. Again because 15 values are input and the extra buffer space is left off at scale number 2 at the end of the line, the next set of input lines 406 in FIG. 7C are read into the buffer starting at scale number 3.

Figure 8:
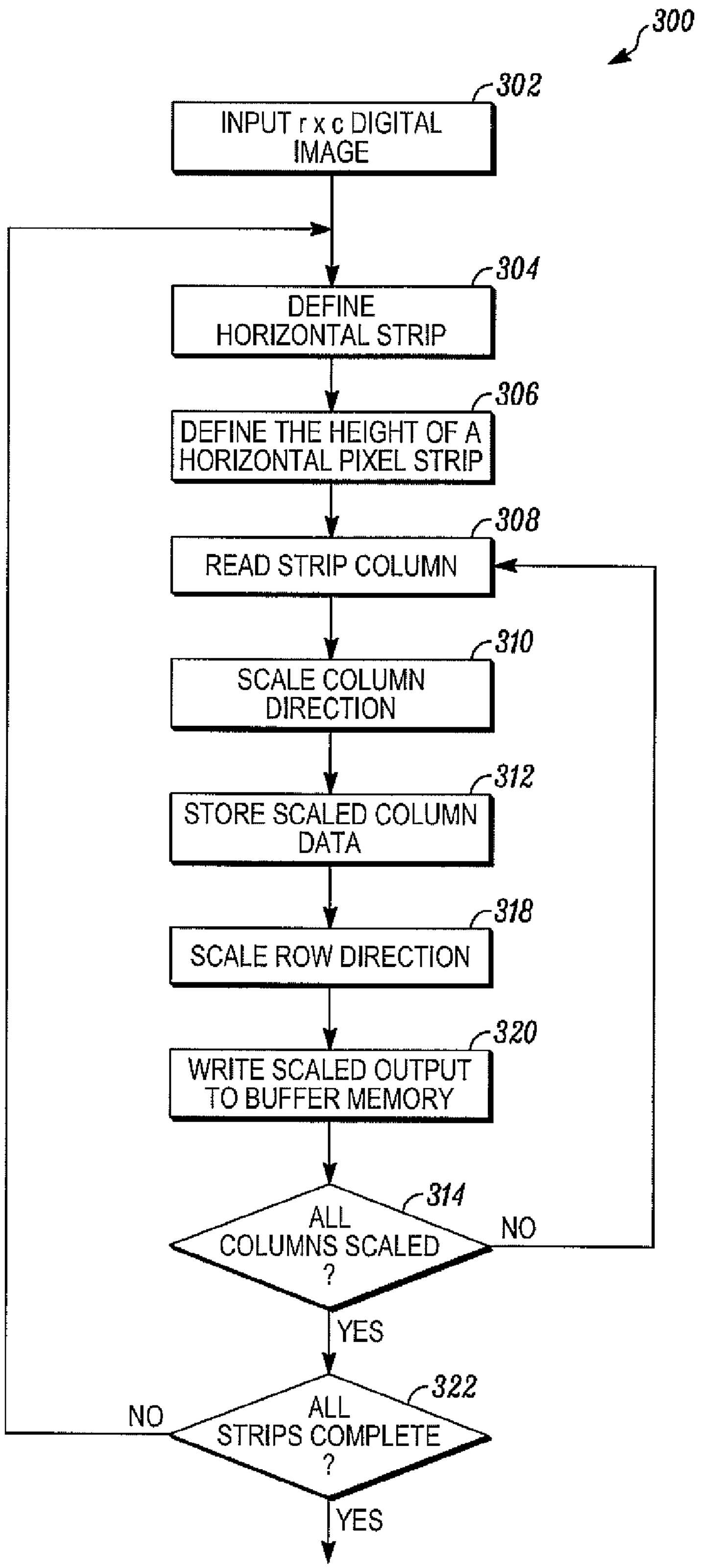
FIG. 8 is a flowchart showing a method of scaling a digital image in accordance with a second embodiment.

FIG. 8 is a flowchart 300 illustrating a method for scaling a digital image according to a second embodiment of the invention. The digital image in the form of an r×c pixel array is received at 302. The image is divided into a plurality of horizontal pixel strips at 304 which are processed separately from one another. The height H of the horizontal pixel strips is set at 306. The height H of the horizontal pixel strips is defined in terms of the total number of pixel rows contained in each horizontal pixel strip. Pixels outside the defined strip are not scaled in the current operation. At 306, the scaling block 16 automatically determines the new height of the scaled output pixel strip and allocates its internal buffering as well as indicates to the write DMA engine 18 the ending pixel for each scaled output column of pixel data. Because the height calculation can vary strip-to-strip within an image, this calculation saves the firmware from programming the scaling block 16 with this information.

Next, at 308-314, the pixel values from the pixel strip are traversed in column-by-column fashion, and scaling is performed by the scaling block 16. Specifically, the scaling block 16 takes the columnar pixel values at 308 from a first column and performs the scaling in the Y-direction (column direction) on the column at 310. The scaled output data is then stored at 312 in a temporary register. After scaled output data is accumulated in the memory, the scaling block performs scaling in the X-direction (row direction) progressively on all of the stored Y-scaled columns at 318. Row-scaled pixel data is then output into the buffer memory 20 at 320. If more columns remain in the strip to be processed as determined at 314, successive columns from the pixel strip are read back at 308. The scaling process continues in this fashion until all of the columns in the pixel strip are read. Further horizontal pixel strips may be scanned and scaled as determined at 322 until the entire image is scaled.

It is important to note that other scaling operations or processing techniques may be utilized in the scaling block 16 to scale the selected pixel data in addition to basic multiplier operations. For example, bicubic, linear or cubic interpolation techniques may be implemented in the scale block 16.

It is intended that the foregoing detailed description be understood as an illustration of selected forms that the invention can take, and not as a definition of the invention. It is only the following claims, including all equivalents that are intended to define the scope of this invention.

The invention claimed is:

1. An image forming apparatus comprising:

a storage device configured to store image data organized into a first horizontal pixel strip and a second horizontal pixel strip;

an access engine configured to read the image data from the first horizontal pixel strip and the second horizontal pixel strip in a column-by-column sequence; and an image processor adapted to scale the first horizontal pixel strip in a horizontal direction and in a vertical direction, wherein the image processor scales the first horizontal pixel strip in the horizontal direction by calculating a fractional pixel value from a first row of the first horizontal pixel strip for use in a second row of the first horizontal pixel strip.

2. The image forming apparatus of claim 1, further comprising:

a temporary buffer configured to store the fractional pixel value.

3. The image forming apparatus of claim 2, wherein the temporary buffer is cleared after the first horizontal pixel strip is processed.

4. The image forming apparatus of claim 1, further comprising:

a scan sensor configured to acquire the image data and send the image data to the storage device, wherein the image forming apparatus is a copier.

5. The image forming apparatus of claim 1, wherein the image forming apparatus is a printer.

6. The image forming apparatus of claim 1, further comprising:

a memory for storing output data for the first horizontal pixel strip.

7. The image forming apparatus of claim 6, further comprising:

a write engine adapted to write the output data into the memory.

8. The image forming apparatus of claim 1, wherein the image processor is configured to scale the second horizontal pixel strip in the horizontal direction and assemble the scaled first horizontal pixel strip and the scaled second horizontal pixel strip into output data.

9. The image forming apparatus of claim 1, wherein the first row of the first horizontal pixel strip includes one pixel.

10. The image forming apparatus of claim 1, further comprising:

a temporary buffer configured to store the fractional pixel value from the first row of the first horizontal pixel strip, wherein the fractional pixel value is accessed for the second row of the first horizontal pixel strip and the fractional pixel value is cleared before the image processor scales the second horizontal pixel strip.

11. A method of printing an image comprising:

receiving image data from a source;

storing the image data as a plurality of pixel strips;

reading the image data from the plurality of pixel strips in a column-by-column sequence;

scaling using an image processor a pixel strip of the plurality of pixel strips in a first direction; and scaling using the image processor the pixel strip in a second direction by adding a fractional pixel value from a first row of the pixel strip to a second row of the pixel strip.

12. The method of claim 11, wherein the first direction is a vertical direction and the second direction is a horizontal direction.

13. The method of claim 11, wherein at least one of the plurality of pixel strips has fewer rows than columns.

14. The method of claim 11, wherein at least one of the plurality of pixel strips has a plurality of columns.

15. The method of claim 11, further comprising:

storing the fractional pixel value in a temporary buffer; and clearing the temporary buffer after the pixel strip is processed.

16. The method of claim 11, wherein the source is a scan sensor of an image forming apparatus.

17. The method of claim 16, wherein the image forming apparatus is a copier.

18. The method of claim 11, wherein the source is a host in communication with a printer.

19. A method of processing an image comprising:

receiving image data from a source;

storing the image data as a plurality of pixel strips;

reading the image data from the plurality of pixel strips in a column-by-column sequence;

scaling using an image processor a column of the plurality of pixel strips in a vertical direction;

scaling using the image processor a first row of the column in a horizontal direction; and carrying a partial pixel value from the first row of the column to a second row of the column.

20. The method of claim 19, further comprising:

sending the scaled column to an output device.

* * * * *